Feb. 9, 1926.
R. C. ROSE
1,572,561
AUTOMOBILE FOUR-WHEEL DRIVE
Filed Dec. 1, 1922
2 Sheets-Sheet 1
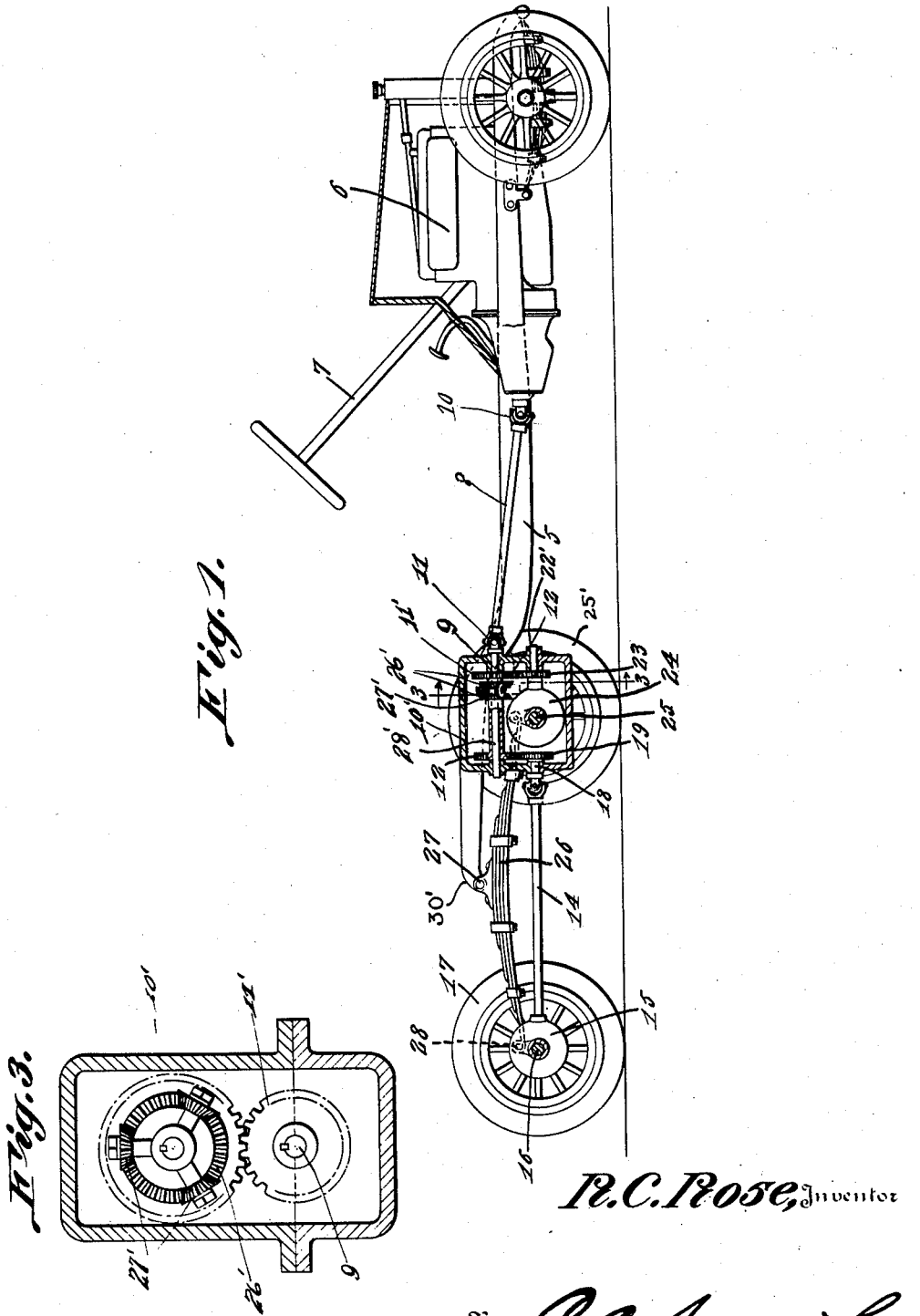

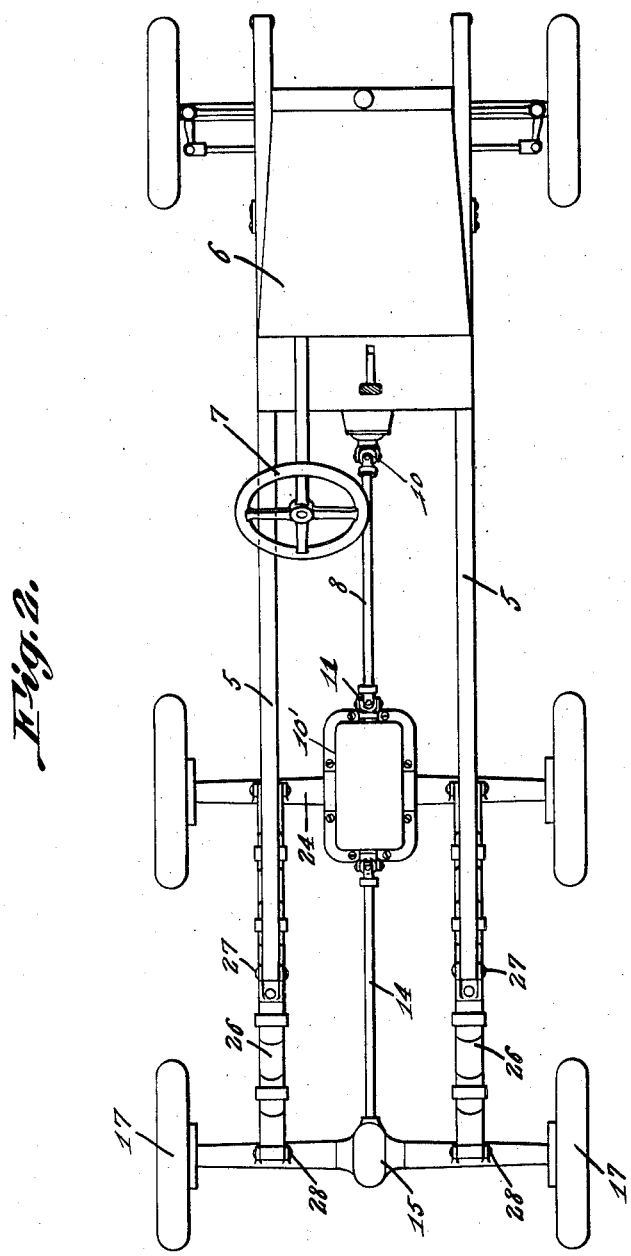

Patented Feb. 9, 1926.

1,572,561

UNITED STATES PATENT OFFICE.

RICHARD C. ROSE, OF OSCEOLA, ARKANSAS.

AUTOMOBILE FOUR-WHEEL DRIVE.

Application filed December 1, 1922. Serial No. 604,333.

*To all whom it may concern:*

Be it known that I, RICHARD C. ROSE, a citizen of the United States, residing at Osceola, in the county of Mississippi and State of Arkansas, have invented a new and useful Automobile Four-Wheel Drive, of which the following is a specification.

This invention relates to motor vehicle constructions, and more particularly to motor vehicle constructions of the four-wheel drive type.

The primary object of the invention is to provide means for connecting the drive axle housings so that one axle may move with respect to the other axle and at the same time maintain the body of the vehicle in a horizontal position.

A further object of the invention is to provide a construction of this character, wherein the power from the forward drive shaft may be transmitted to the rear drive shaft.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a motor vehicle chassis equipped with a four-wheel drive construction in accordance with the invention.

Figure 2 is a plan view thereof.

Figure 3 is a sectional view taken on line 3—3 of Fig. 1.

Referring to the drawings in detail, the reference character 5 designates guide rails of the chassis of a motor vehicle, on which chassis is supported the usual motor 6 and steering mechanism 7.

The propeller shaft is indicated at 8 and has connection with the crank shaft of the motor as through the universal joint 10, the rear end of the propeller shaft having connection with the shaft 9, as through the universal joint 11. The inner end of the shaft 9 is disposed within the housing 10' and carries a pinion 11' which is normally in mesh with the pinion 23 of the shaft 22' to transmit movement thereto. The inner end of the shaft 22' is provided with a beveled pinion not shown, and is disposed within the differential housing 24, the differential being of the usual and well known construction to permit the wheels 25' of the shaft 25, to move with respect to each other, at various speeds.

Pinions 26' are disposed within the housing 10' between which pinions operate the planetary pinions 27' which rotate the shaft 28' that supports the pinion 12. This pinion 12 is normally in mesh with pinion 19 carried at one end of the shaft 18, which in turn has connection with the shaft 14 that supplies power to the rear axle 16 through the usual differential construction housed by the housing 15, which axle 16 supports the wheels 17.

As shown, the side rails 5 of the chassis extend rearwardly beyond the axle 25, as at 30', where the same have pivotal connection with the spring members 26, as at 27, the · forward ends of the spring members 26 being pivotally connected with the forward axle housing, while the rear ends thereof have pivotal connection with the rear axle housing as at 28. Thus it will be seen that should the wheels associated with the forward drive axle pass into hollow portions of a road surface vertical movement of the forward drive axle would be permitted and compensated for, by the spring construction as described.

What is claimed is:—

In a four-wheel drive motor vehicle, a chassis including side rails, a pair of rear drive axles, spring members connecting the rear drive axles, means for pivotally connecting the rear ends of the side rails of the chassis to the spring members at points intermediate the ends of the spring members, a propeller shaft, a transmission housing housing a portion of one of the axles, a transmission mechanism in the housing, said propeller shaft adapted to transmit motion to the transmission and axle supporting the housing, and means for transmitting motion from the transmission to the rear drive axle.

In testimony that I claim the foregoing as my own, I have hereto affixed my signature.

RICHARD C. ROSE.